(12) United States Patent
Liang et al.

(10) Patent No.: US 10,997,256 B2
(45) Date of Patent: May 4, 2021

(54) WEBPAGE CLASSIFICATION METHOD AND APPARATUS, CALCULATION DEVICE AND MACHINE READABLE STORAGE MEDIUM

(71) Applicant: GUANGZHOU UCWEB COMPUTER TECHNOLOGY CO., LTD., Guangdong (CN)

(72) Inventors: Jie Liang, Guangzhou (CN); Haihong Zheng, Guangzhou (CN); Hongcai Zou, Guangzhou (CN)

(73) Assignee: Guangzhou UCWeb Computer Technology Co., Ltd., Guangdong (CN)

( * ) Notice: Subject to any disclaimer, the term of this patent is extended or adjusted under 35 U.S.C. 154(b) by 665 days.

(21) Appl. No.: 15/505,851

(22) PCT Filed: May 5, 2016

(86) PCT No.: PCT/CN2016/081139
§ 371 (c)(1),
(2) Date: Feb. 22, 2017

(87) PCT Pub. No.: WO2016/180270
PCT Pub. Date: Nov. 17, 2016

(65) Prior Publication Data
US 2018/0218241 A1    Aug. 2, 2018

(30) Foreign Application Priority Data

May 8, 2015  (CN) .......................... 201510230951.2

(51) Int. Cl.
*G06K 9/62* (2006.01)
*G06F 16/951* (2019.01)
(Continued)

(52) U.S. Cl.
CPC .......... *G06F 16/953* (2019.01); *G06F 16/951* (2019.01); *G06F 16/954* (2019.01);
(Continued)

(58) Field of Classification Search
USPC ......................................................... 707/710
See application file for complete search history.

(56) References Cited

U.S. PATENT DOCUMENTS 6,233,575 B1 *  5/2001  Agrawal ............... G06F 16/355
6,360,227 B1 *  3/2002  Aggarwal ............. G06F 16/954
(Continued)

FOREIGN PATENT DOCUMENTS

CN     1158460 A      9/1997
CN   102207961 A     10/2011
(Continued)

OTHER PUBLICATIONS

International Search Report and Written Opinion for Application No. PCT/CN2016/081139, dated Aug. 17, 2016, 10 pages.
(Continued)

*Primary Examiner* — Tamara T Kyle
*Assistant Examiner* — Raheem Hoffler
(74) *Attorney, Agent, or Firm* — Sheppard Mullin Richter & Hampton LLP (57) ABSTRACT

A webpage classification method and apparatus, a computing device and a machine readable storage medium are disclosed. Each corpus word in a corpus is converted into a vector by using a word-to-vector tool word2vec, and therefore a processing process such as comparison between corpus words or similarity analysis is converted into vector calculation, so as to more conveniently implement computer automation, thereby improving webpage classification efficiency. Moreover, corresponding corpus words are screened according to preset classification seed words, and a corpus
(Continued)

word unrelated to a webpage type may be removed, thereby improving webpage classification accuracy.

19 Claims, 3 Drawing Sheets

(51) Int. Cl.
*G06F 16/954* (2019.01)
*G06F 40/258* (2020.01)
*G06F 17/16* (2006.01)
*G06F 16/958* (2019.01)
*G06F 16/953* (2019.01)
*G06F 16/9532* (2019.01)
*G06F 16/9538* (2019.01)

(52) U.S. Cl.
CPC ......... *G06F 16/9532* (2019.01); *G06F 17/16* (2013.01); *G06F 40/258* (2020.01); *G06K 9/6267* (2013.01); *G06F 16/958* (2019.01); *G06F 16/9538* (2019.01)

(56) References Cited

U.S. PATENT DOCUMENTS

| | | | | |
|---|---|---|---|---|
| 8,886,587 | B1* | 11/2014 | Hainsworth | G06N 5/025 706/47 |
| 8,972,376 | B1* | 3/2015 | Gailis | G06F 16/951 707/710 |
| 9,183,286 | B2* | 11/2015 | Chen | G06F 16/353 |
| 2003/0061200 | A1* | 3/2003 | Hubert | G06Q 30/0601 |
| 2004/0199497 | A1* | 10/2004 | Timmons | G06F 16/955 |
| 2007/0288503 | A1* | 12/2007 | Taylor | G06Q 30/02 |
| 2008/0294584 | A1* | 11/2008 | Herz | G06Q 30/0207 706/46 |
| 2009/0171943 | A1* | 7/2009 | Majumder | G06F 16/951 |
| 2011/0004588 | A1* | 1/2011 | Leitersdorf | G06F 16/951 707/711 |
| 2011/0078159 | A1* | 3/2011 | Li | G06F 16/24534 707/749 |
| 2011/0145348 | A1* | 6/2011 | Benyamin | H04L 51/32 709/206 |
| 2013/0073569 | A1* | 3/2013 | Lee | G06K 9/6282 707/749 |
| 2013/0132365 | A1* | 5/2013 | Chang | G06Q 30/0241 707/710 |
| 2013/0132401 | A1* | 5/2013 | Moon | G06F 16/951 707/748 |
| 2013/0159306 | A1* | 6/2013 | Janssen, Jr. | G06F 16/3338 707/737 |
| 2016/0217144 | A1 | 7/2016 | Yu | |
| 2018/0129738 | A1* | 5/2018 | Takeda | G06F 16/9535 |
| 2020/0233917 | A1* | 7/2020 | Kurtanovic | G06F 9/547 |

FOREIGN PATENT DOCUMENTS

| | | |
|---|---|---|
| CN | 102831246 A | 12/2012 |
| CN | 102955791 A | 3/2013 |
| CN | 103605702 A | 2/2014 |
| CN | 103605794 A | 2/2014 |
| CN | 104331498 A | 2/2015 |
| CN | 104424308 A | 3/2015 |
| JP | 2010-067005 A | 3/2010 |

OTHER PUBLICATIONS

PCT International Preliminary Report on Patentability dated Nov. 23, 2017, issued in related International Application No. PCT/CN2016/081139 (11 pages).

First Search dated Mar. 26, 2019, issued in related Chinese Application No. 201510230951.2 (1 page).

First Office Action dated Apr. 3, 2019, issued in related Chinese Application No. 201510230951.2 (13 pages), with English machine translation.

Bai Xue et al., "A Study on Sentiment Computing and Classification of Sina Weibo with Word2vec", 2014 IEEE International Congress on Big Data, Sep. 25, 2014, pp. 358-363.

Notice of Substantive Examination Result dated Jun. 24, 2019, issued in related Indonesian Application No. P00 2017 01611, with English machine translation (4 pages).

First Examination Report dated Jul. 10, 2020, issued in related Indian Application No. 201747007087 (5 pages).

\* cited by examiner

WEBPAGE CLASSIFICATION METHOD AND APPARATUS, CALCULATION DEVICE AND MACHINE READABLE STORAGE MEDIUM

CROSS-REFERENCE TO RELATED APPLICATIONS

This application is a national phase application of International Application No. PCT/CN2016/081139, filed on May 5, 2016, which claims priority to and benefits of Chinese Patent Application No. 201510230951.2, filed on May 8, 2015. The contents of the above-referenced applications are incorporated herein by reference in their entirety.

TECHNICAL FIELD

This application relates to the field of webpage processing technologies, and in particular, to a webpage classification method and apparatus, a computing device and a machine readable storage medium.

BACKGROUND

With rapid development of the Internet, more abundant information comes from the network. Webpage classification is performed according to information presented in a webpage. This not only may help a user rapidly and conveniently find preferred information in a network application aspect, but also may determine preferred information of different users according to types of webpages browsed by the users at a demand analysis stage of network related product development.

In a related technology, for webpage classification, massive webpages generally need to be parsed, characteristic data is extracted from uniform resource locators (URL) and headers of the webpages and used as training data, and a classification model established based on a classification algorithm is trained by using the training data, to obtain a webpage classifier. Therefore, when a target webpage is classified, target characteristic data of the target webpage is first extracted, then the target characteristic data is analyzed according to the foregoing webpage classifier, and a type of the target webpage may be learned. Frequently used classification algorithms include a decision tree classification method, a native Bayesian classifier algorithm (native Bayesian classifier), a support vector machine (Support Vector Machine, SVM) based classification algorithm, a neural network method, a k-nearest neighbor method (kNN), a fuzzy classification method and the like.

It can be seen that, for webpage classification implemented based on the foregoing method, characteristic data includes a large quantity of short sentences or words, and a data processing amount is large; particularly, for a Chinese webpage, characteristic data of the Chinese webpage is mostly Chinese words, processing complexity is higher, and corresponding webpage classification efficiency is relatively low.

SUMMARY

To overcome the problem existing in the related technology, this application provides a webpage classification method and apparatus, a computing device and a non-transitory machine readable storage medium.

A first aspect of embodiments of this application provides a webpage classification method, including:

training a corpus by using a word-to-vector tool such as word2vec, obtaining a vector corresponding to each corpus word in the corpus, and recording each corpus word and the corresponding vector in a classification model file, where the corpus words in the corpus are associated with a title and a keyword in a header of a webpage;

determining a vector corresponding to each preset classification seed word corresponding to each webpage category according to the classification model file, and calculating a vector sum of all classification seed words corresponding to a same webpage category;

searching the classification model file for corpus words corresponding to vectors, which are within a predetermined similarity range with the vector sum, and recording the found corpus words, the corresponding similarities, and a webpage category corresponding to the vector sum in a scoring model file;

searching the scoring model file for target corpus words corresponding to a target title and a target keyword in a header of a target webpage;

determining a target similarity and a target webpage category corresponding to each target corpus word according to the scoring model file; and selecting at least one target webpage category as a classification result of the target webpage according to the determined target similarity.

With reference to the first aspect, in a first feasible embodiment of the first aspect, the determining a target similarity corresponding to each target corpus word according to the scoring model file includes:

separately setting weight coefficients corresponding to the target title and the target keyword;

for a first target corpus word corresponding to the target title, calculating a product of a reference similarity corresponding to the first target corpus word in the scoring model file and a first weight coefficient corresponding to the target title, and obtaining a target similarity corresponding to the first target corpus word; and for a second target corpus word corresponding to the target keyword, calculating a product of a reference similarity corresponding to the second target corpus word in the scoring model file and a second weight coefficient corresponding to the target keyword, and obtaining a target similarity corresponding to the second target corpus word.

With reference to the first aspect, or the first feasible embodiment of the first aspect, in a second feasible embodiment of the first aspect, the webpage classification method further includes:

separately using each webpage under a same domain name as the target webpage, and determining a classification result of each webpage; and in response to judging that the classification result of each webpage under the same domain name and a similarity corresponding to the classification result satisfy a preset threshold condition, recording the corresponding domain name as a perpendicular domain name in a perpendicular domain name list.

With reference to the second feasible embodiment of the first aspect, in a third feasible embodiment of the first aspect, the webpage classification method further includes:

if the target title or the target keyword cannot be obtained, judging whether a target domain name corresponding to the target webpage exists in the domain name perpendicular list; and in response to judging that the target domain name exists in the domain name perpendicular list, determining a target webpage category and a target similarity corresponding to the target webpage according to the target domain name.

With reference to the third feasible embodiment of the first aspect, in a fourth feasible embodiment of the first aspect, the webpage classification method further includes:

in response to judging that the target domain name does not exist in the domain name perpendicular list, determining a target webpage category and a target similarity corresponding to the target webpage according to a uniform resource locator URL corresponding to the target webpage.

A second aspect of the embodiments of this application provides a webpage classification method, including:

a corpus training unit, configured to train a corpus by using a word-to-vector tool word2vec, obtain a vector corresponding to each corpus word in the corpus, and record each corpus word and the corresponding vector in a classification model file, where the corpus words in the corpus are associated with a title and a keyword in a header of a webpage;

a corpus screening unit, configured to determine a vector corresponding to each preset classification seed word corresponding to each webpage category according to the classification model file, and calculate a vector sum of all classification seed words corresponding to a same webpage category; and search the classification model file for corpus words corresponding to vectors, which are within a preset similarity range with the vector sum, and record the found corpus words, the corresponding similarities, and a webpage category corresponding to the vector sum in a scoring model file;

a target webpage processing unit, configured to search the scoring model file for target corpus words corresponding to a target title and a target keyword in a header of a target webpage, and determine a target similarity and a target webpage category corresponding to each target corpus word according to the scoring model file; and a webpage category determining unit, configured to select at least one target webpage category as a classification result of the target webpage according to the determined target similarity.

With reference to the second aspect, in a first feasible implementation manner of the second aspect, the target webpage processing unit includes:

a weight coefficient setting unit, configured to separately set weight coefficients corresponding to the target title and the target keyword; and a target similarity calculation unit, configured to: for a first target corpus word corresponding to the target title, calculate a product of a reference similarity corresponding to the first target corpus word in the scoring model file and a first weight coefficient corresponding to the target title, and obtain a target similarity corresponding to the first target corpus word; and for a second target corpus word corresponding to the target keyword, calculate a product of a reference similarity corresponding to the second target corpus word in the scoring model file and a second weight coefficient corresponding to the target keyword, and obtain a target similarity corresponding to the second target corpus word.

With reference to the second aspect, or the second feasible implementation manner of the second aspect, in a second feasible implementation manner of the second aspect, the webpage classification apparatus further includes:

a perpendicular domain name judging unit, configured to separately use each webpage under a same domain name as the target webpage, and determine a classification result of each webpage; and in response to judging that the classification result of each webpage under the same domain name and a similarity corresponding to the classification result satisfy a preset threshold condition, record the corresponding domain name as a perpendicular domain name in a perpendicular domain name list.

With reference to the second feasible implementation manner of the second aspect, in a third feasible implementation manner of the second aspect, the webpage classification apparatus further includes:

a target domain name processing unit, configured to: if the target title or the target keyword cannot be obtained, judge whether a target domain name corresponding to the target webpage exists in the domain name perpendicular list; and in response to judging that the target domain name exists in the domain name perpendicular list, determine a target webpage category and a target similarity corresponding to the target webpage according to the target domain name.

With reference to the third feasible implementation manner of the second aspect, in a fourth feasible implementation manner of the second aspect, the webpage classification apparatus further includes:

a URL processing unit, configured to: in response to judging that the target domain name does not exist in the domain name perpendicular list, determine a target webpage category and a target similarity corresponding to the target webpage according to a uniform resource locator URL corresponding to the target webpage.

A third aspect of the embodiments of this application provides a computing device, including:

a memory, where the memory stores webpage related information; and a processor, where the processor reads the webpage related information from the memory, and executes the following operations:

training a corpus by using a word-to-vector tool word2vec, obtaining a vector corresponding to each corpus word in the corpus, and recording each corpus word and the corresponding vector in a classification model file, where the corpus words in the corpus are associated with a title and a keyword in a header of a webpage;

determining a vector corresponding to each preset classification seed word corresponding to each webpage category according to the classification model file, and calculating a vector sum of all classification seed words corresponding to a same webpage category;

searching the classification model file for corpus words corresponding to vectors, which are with a preset similarity range with the vector sum, and recording the found corpus word, the corresponding similarities, and a webpage category corresponding to the vector sum in a scoring model file;

searching the scoring model file for target corpus words corresponding to a target title and a target keyword in a header of a target webpage;

determining a target similarity and a target webpage category corresponding to each target corpus word according to the scoring model file; and selecting at least one target webpage category as a classification result of the target webpage according to the determined target similarity.

A fourth aspect of the embodiments of this application provides a non-transitory machine readable storage medium, storing executable code, where when the executable code is executed by a processor, the processor executes the method according to the first aspect of the embodiments of this application.

A fifth aspect of the embodiments of this application further provides a computing device, where the computing device includes a processor and a non-transitory machine readable storage medium. The non-transitory machine readable storage medium stores executable code. When the executable code is executed by the processor, the processor executes the method according to the first aspect of the embodiments of this application.

It can be known from the foregoing technical solution that, in the embodiments of this application, each corpus word in a corpus is converted into a vector, and therefore a processing process such as comparison between corpus words or similarity analysis is converted into vector calculation, so as to more conveniently implement computer automation, thereby improving webpage classification efficiency. Moreover, in the embodiments of this application, corpus words are correspondingly screened according to multiple preset classification seed words, and a corpus word unrelated to a webpage type may be removed, thereby improving webpage classification accuracy.

It will be appreciated that the above general description and the following detailed description are merely exemplary and explanatory, and do not limit the present disclosure.

BRIEF DESCRIPTION OF THE DRAWINGS

The accompanying drawings, which are incorporated in and constitute a part of this specification, illustrate embodiments consistent with the present disclosure and, together with the description, serve to explain the principles of the present disclosure.

DETAILED DESCRIPTION OF EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of apparatuses and methods consistent with aspects related to the present disclosure as recited in the appended claims.

Figure 1:
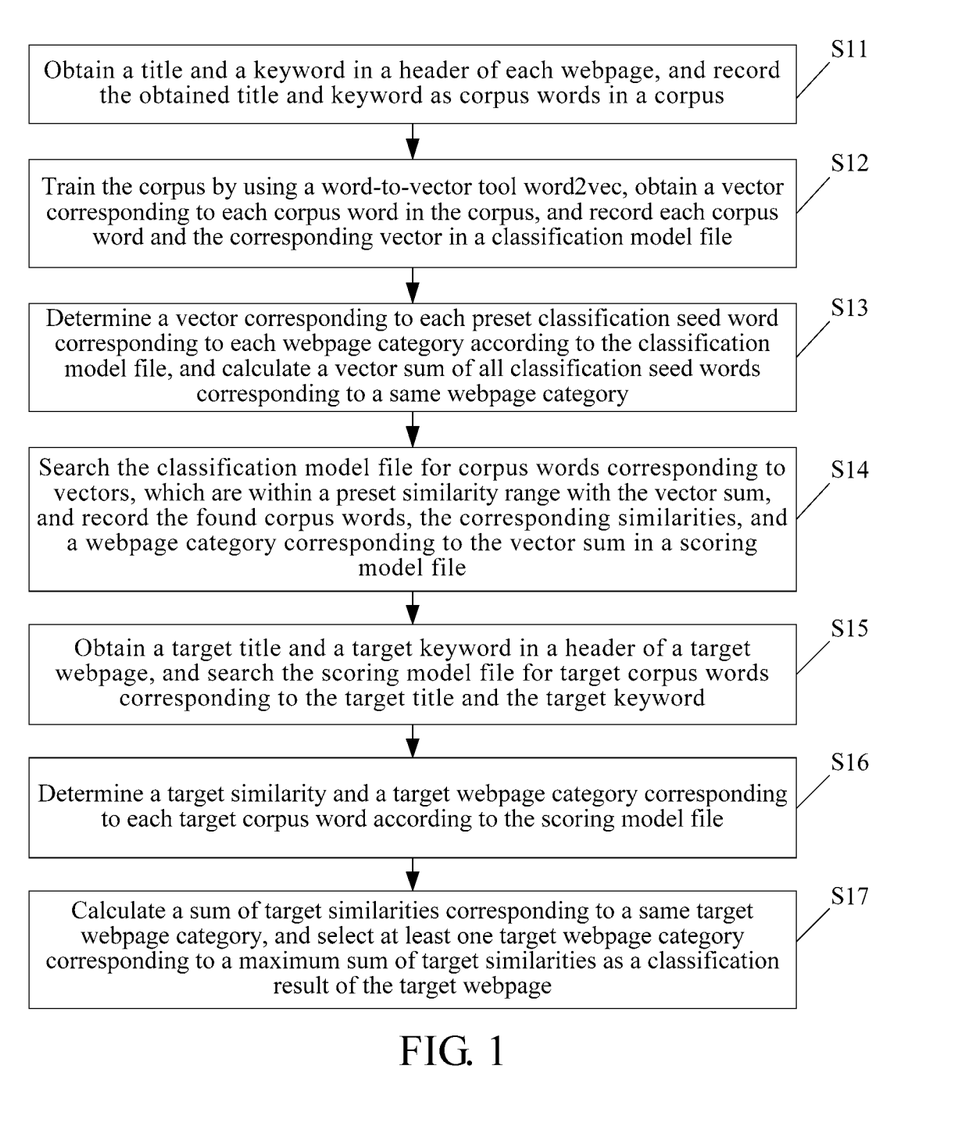
FIG. 1 is a flowchart of a webpage classification method according to an exemplary embodiment.

FIG. 1 is a flowchart of a webpage classification method according to an exemplary embodiment. As shown in FIG. 1, the method includes the following steps.

S11: Obtain a title and a keyword in a header of each webpage, and record the obtained title and keyword as corpus words in a corpus. That is, corpus words in a corpus are associated with a title and a keyword in a header of a webpage.

In this embodiment of this application, massive webpages used to construct a corpus may be derived from a browsing record of a user. A header of each webpage generally includes two fields: a title and a keyword, and therefore a vocabulary in these two fields may be used as corpus words and recorded in a corpus. It should be noted that, this embodiment of this application may be further applied to a conventional corpus related to a webpage header. For example, if webpage classification is periodically performed, a corpus constructed when webpage classification is performed last time may be used.

Additionally, because a title is generally in a sentence or phrase form rather than a single word, word segmentation needs to be performed on the title by using a word segmentation tool; a keyword itself is a single word, and no word segmentation operation needs to be performed on the keyword.

S12: Train the corpus by using a word-to-vector tool word2vec, obtain a vector corresponding to each corpus word in the corpus, and record each corpus word and the corresponding vector in a classification model file.

The foregoing word2vec is a text processing tool, which allocates a unique vector to each word by analyzing a similarity between massive words, and is applied to this embodiment of this application, that is, determine a vector corresponding to each corpus word by analyzing a similarity between corpus words in a corpus. For convenience of denoting a complex similarity relationship between words, the vector is a multi-dimensional vector, for example, [0.792, −0.177, −0.107, 0.109, −0.542, . . . ]. A higher similarity between two corpus words corresponds to a smaller vector difference (the vector difference may be a cosine value of an angle between two vectors). In this embodiment, the classification model file may specifically be a binary file in a BIN format. For example, the classification model file may be named word.bin, and records each corpus word and a vector corresponding to each corpus word.

S13: Determine a vector corresponding to each preset classification seed word corresponding to each webpage category according to the classification model file, and calculate a vector sum of all classification seed words corresponding to a same webpage category.

In this embodiment of this application, for each webpage category, for example, novel, sports, or sciences and technologies, multiple related words that may occur in a webpage are preset, and used as classification seed words. For example, novel related classification seed words may include: online novel, novel, novel bibliotheca, classical novel, excellent novel, novel online, novel collected works, novel collection, series novel, original novel, txt collected works, romantic novel, love story novel, fantasy novel, fantastic novel, science fiction, martial arts novel, supernatural novel, metropolitan special ability, collaborative content creation and slash, collaborative content creation novel, supernatural or magical power novel, time-travel novel, immortality cultivation novel, suspense novel, terror novel, detective reasoning, detective novel, reasoning novel, youthful campus and the like.

For each classification seed word, a vector corresponding to the classification seed word is first determined. A specific method for determining the vector includes: searching the classification model file for a corpus word most similar to the classification seed word, and then recording a vector corresponding to the corpus word as the vector corresponding to the classification seed word. Further, addition calculation may be executed on the vector obtained through word2vec conversion, and vectors corresponding to classification seed words corresponding to a same webpage category are added, to obtain a vector sum corresponding to the webpage category. For example, vectors corresponding to the foregoing novel related classification seed words are added, to obtain a vector sum corresponding to a "novel" category.

S14: Search the classification model file for corpus words corresponding to vectors, which are within a preset similarity range with the vector sum, and record the found corpus words, the corresponding similarities, and a webpage category corresponding to the vector sum in a scoring model file.

The foregoing classification model file is traversed, similarities between vectors recorded in the classification model file and the foregoing vector sum are separately calculated, vectors with a similarity with the vector sum in a preset range are screened out, and corpus words corresponding to the vectors are correspondingly recorded in the scoring model file.

In the foregoing steps S13 and S14, by performing processing calculation on the vectors, corpus words describing a webpage type are screened out from the classification model file, and are all recorded in the scoring model file.

In a feasible embodiment of this application, a similarity between vectors may be specifically denoted as a cosine value of an angle between the vectors, that is, the value ranges from 0 to 1.

In another feasible embodiment of this application, a similarity between vectors may be further denoted by using a score in a centesimal system, that is, the foregoing cosine value is multiplied by 100, to obtain a corresponding score.

Additionally, the foregoing scoring model file may be a text file in a TXT format, for example, may be named word.txt, and is in a storage format of "a corpus word found according to a vector sum: a webpage category corresponding to the vector sum: similarity", where the webpage category corresponding to the vector sum is a webpage category corresponding to the found corpus word. For example, if corpus words A and B are found according to the vector sum corresponding to the foregoing "novel" category, and have respective similarities of 95 and 80, "A: novel: 95" and "B: novel: 80" may be respectively recorded in the scoring model file.

S15: Obtain a target title and a target keyword in a header of a target webpage, and search the scoring model file for target corpus words corresponding to the target title and the target keyword.

Similar to step S11, for the target title, a word segmentation operation needs to be executed on the target title, and the target title is divided from a phrase or sentence into multiple words. After word segmentation is completed, corpus words corresponding to the words obtained after word segmentation is performed on the target title and target keywords are selected from the scoring model file and used as target corpus words.

S16: Determine a target similarity and a target webpage category corresponding to each target corpus word according to the scoring model file.

S17: Calculate a sum of target similarities corresponding to a same target webpage category, and select at least one target webpage category corresponding to a maximum sum of target similarities as a classification result of the target webpage.

For example, the target corpus words found according to the scoring model file include A, B and C, and target webpage categories corresponding to A and B are both "novel", target similarities corresponding to A and B are separately 90 and 85, a target webpage category corresponding to C is "sports", and a target similarity corresponding to C is 80, and therefore the target similarities corresponding to A and B are added, that is, a sum of the target similarities corresponding to "novel" is 175. Because 175>80, "novel" is preferentially selected as the classification result of the target webpage.

It can be known from the foregoing technical solution that, in the embodiments of this application, each corpus word in a corpus is converted into a vector, and therefore a processing process such as comparison between corpus words or similarity analysis is converted into vector calculation, so as to more conveniently implement computer automation, thereby improving webpage classification efficiency. Moreover, in the embodiments of this application, corresponding corpus words are screened according to preset classification seed words, and a corpus word unrelated to a webpage type may be removed, thereby improving webpage classification accuracy.

In this embodiment, only a webpage category corresponding to a target corpus word having a maximum target similarity may be selected as the classification result of the target webpage; target corpus words may be sorted in a descending order of target similarities, and webpage categories corresponding to first N target corpus words are selected as the classification result of the target webpage; or webpage categories corresponding to all target corpus words whose target similarities are greater than the preset threshold may be selected as the classification result of the target webpage. N and the preset threshold may be both set according to an actual application requirement, for example, N=10, and the preset threshold is 80 (a score is used to denote a similarity) or 0.8 (a cosine value is used to denote a similarity). It should be noted that, persons skilled in the art under teaching of the foregoing examples may completely conceive other implementation manners of determining a target webpage category according to a target similarity. To sum up, at least one target webpage category may be selected as a classification result of the target webpage according to the determined target similarity.

In a feasible embodiment of this application, in the foregoing step S16, a similarity corresponding to a target corpus word recorded in the scoring model file may be directly used as a target similarity. In another feasible embodiment of this application, a target similarity may be further determined by using the following method:

separately setting weight coefficients corresponding to the target title and the target keyword;

for a first target corpus word corresponding to the target title, calculating a product of a reference similarity corresponding to the first target corpus word in the scoring model file and a first weight coefficient, and obtaining a target similarity corresponding to the first target corpus word; and for a second target corpus word corresponding to the target keyword, calculating a product of a reference similarity corresponding to the second target corpus word in the scoring model file and a second weight coefficient, and obtaining a target similarity corresponding to the second target corpus word.

Generally, a title can more accurately reflect a type of a webpage than a keyword, and therefore the first weight coefficient corresponding to the target title is greater than the second weight coefficient corresponding to the target keyword. For example, the first weight coefficient may be set to 1, and the second weight coefficient may be set to 0.8; therefore the target similarity corresponding to the first target corpus word is a product of the reference similarity of the first target corpus word and 1, and the target similarity corresponding to the second target corpus word is a product of the reference similarity of the second target corpus word and 0.8.

In the foregoing embodiment, by setting a weight coefficient, a probability that a target corpus word corresponding to a target title is determined as a classification result of a target webpage is improved, and webpage classification accuracy is improved.

Figure 2:
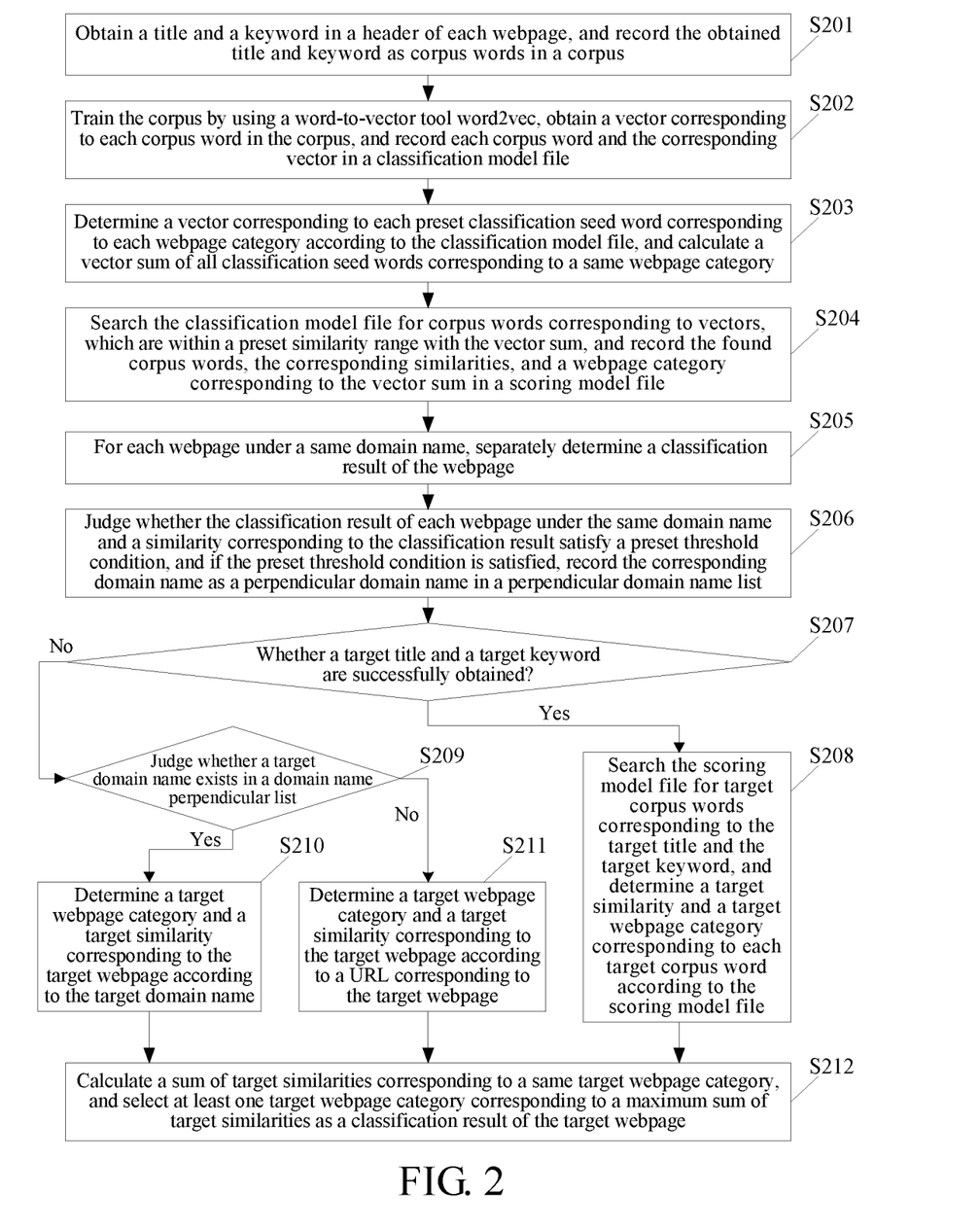
FIG. 2 is a flowchart of another webpage classification method according to an exemplary embodiment.

Referring to FIG. 2, a webpage classification method provided in another implementation manner of this application may include the following steps:

S201: Obtain a title and a keyword in a header of each webpage, and record the obtained title and keyword as corpus words in a corpus.

S202: Train the corpus by using a word-to-vector tool word2vec, obtain a vector corresponding to each corpus word in the corpus, and record each corpus word and the corresponding vector in a classification model file.

S203: Determine a vector corresponding to each preset classification seed word corresponding to each webpage category according to the classification model file, and calculate a vector sum of all classification seed words corresponding to a same webpage category.

S204: Search the classification model file for corpus words corresponding to vectors, which are within a preset similarity range with the vector sum, and record the found corpus words, the corresponding similarities, and a webpage category corresponding to the vector sum in a scoring model file.

S205: For each webpage under a same domain name, separately determine a classification result of the webpage.

Referring to the embodiment shown in FIG. 1, the specific step of determining a classification result of each webpage under a same domain name is as follows: for each webpage, separately searching the scoring model file for a target corpus word corresponding to a title and a keyword of the webpage, determining a target similarity and a target webpage category corresponding to the found target corpus word, calculating a sum of target similarities corresponding to a same target webpage category, and selecting at least one target webpage category corresponding to a maximum sum of target similarities as a classification result of the corresponding webpage.

S206: Judge whether the classification result of each webpage under the same domain name and a similarity corresponding to the classification result satisfy a preset threshold condition, and if the preset threshold condition is satisfied, record the corresponding domain name as a perpendicular domain name in a perpendicular domain name list.

Multiple webpages exist under a domain name, and multiple webpage categories exist in a classification result of a webpage, and therefore a domain name also corresponds to multiple webpage categories. The judging whether a domain name is a preset threshold condition of a perpendicular domain name includes at least the following three items:

1) A ratio of a sum of similarities of multiple corpus words corresponding to a webpage category used as a classification result of each webpage under the domain name to a sum of similarities of all corpus words corresponding to the webpage is greater than a first ratio.

For example, a classification result of a webpage includes two webpage categories: "novel" and "sports", where corpus words corresponding to "novel" include A and B, and similarities denoted by using scores are separately 90 and 85, a corpus word corresponding to "sports" is C, and a corresponding similarity is 80; therefore, a formula for calculating a ratio of the similarities corresponding to "novel" is (90+85)/(90+85+80).

2) At least one common webpage category exists, and a quantity of webpages of the common webpage category existing in a classification result under the domain name is greater than a preset value.

A classification result of each webpage may include multiple webpage categories (that is, each webpage may correspond to multiple webpage categories), classification results of different webpages may also have a same webpage category (that is, webpage categories corresponding to different webpages may be partially or completely the same), and if a quantity of webpages of a webpage category D existing in a classification result under the domain name is greater than the preset value, D may be referred to as a common webpage category of these webpages.

3) At least one common webpage category exists, and a ratio of a quantity of webpages of the common webpage category existing in a classification result under the domain name to a quantity of all webpages under the domain name is greater than a second ratio.

The first ratio, the preset value and the second ratio may be all set according to an actual application case, and are not specifically limited in this application. If a summarized result corresponding to a domain name satisfies the foregoing three conditions at the same time, it may be judged that the domain name is a perpendicular domain name, that is, types of all webpages corresponding to the domain name are the same.

Additionally, when it is judged that a domain name is a perpendicular domain name, in this embodiment, a common webpage category satisfying the foregoing conditions 2) and 3) may be further used as a webpage category corresponding to the domain name (that is, a category of each webpage under the domain name is a common webpage category), and a similarity of the common webpage category is correspondingly recorded. In a feasible embodiment, while the judged perpendicular domain name is stored, a webpage category of the judged perpendicular domain name and a corresponding similarity may be stored. For example, the webpage category and the similarity corresponding to the perpendicular domain name may be also recorded in the foregoing perpendicular domain name list, so as to facilitate query and use in subsequent steps (for example, in the following step S210).

S207: Obtain a target title and a target keyword in a header of a target webpage, and if the obtaining is successful, execute step S208; otherwise execute step S209.

S208: Search the scoring model file for target corpus words corresponding to the target title and the target keyword, determine a target similarity and a target webpage category corresponding to each target corpus word according to the scoring model file, and execute step S212.

S209: If the target title or the target keyword is lacking, judge whether a target domain name corresponding to the target webpage exists in the domain name perpendicular list, and if exists, execute step S210; otherwise execute step S211.

S210: Determine a target webpage category and a target similarity corresponding to the target webpage according to the target domain name, and execute step S212.

According to a perpendicular domain name rule, webpage categories of all webpages corresponding to a perpendicular domain name are the same, and a webpage category and a similarity corresponding to a target domain name may be directly correspondingly used as a target webpage category and a target similarity of a target webpage.

In a feasible embodiment of this application, the common webpage category obtained in the judging process of step S206 and the corresponding similarity may be recorded as a webpage category and a similarity of a corresponding perpendicular domain name, and therefore the target domain name is read directly from a record result in step S210.

In another feasible embodiment of this application, a webpage category corresponding to each perpendicular domain name and a similarity of the webpage category may be further directly set. For example, a webpage category corresponding to a domain name "sports.sina.com.cn" may be set to "sports", and has a similarity of 90.

S211: Determine a target webpage category and a target similarity corresponding to the target webpage according to a URL corresponding to the target webpage, and execute step S212.

In this embodiment of this application, a corresponding webpage category and similarity may be preset and stored for a URL of an ordinary domain name and an ordinary characteristic. For example, a webpage category corresponding to a URL satisfying the following characteristic "xxx.com/sport" may be preset to "sports", and has a similarity of 80.

S212: Calculate a sum of target similarities corresponding to a same target webpage category, and select at least one target webpage category corresponding to a maximum sum of target similarities as a classification result of the target webpage.

In the foregoing steps, S209 to S211 are used as supplementary steps in a case of lacking of header data of the target webpage (including lack of a title, lack of a keyword or the like). That is, because the header data is lacking, the target webpage category and the target similarity of the target webpage cannot be determined by using step S208, but by executing steps S209 to S211, the target webpage category and the target similarity of the target webpage may be determined according to the target domain name corresponding to the target webpage or the URL characteristic, thereby ensuring classification result accuracy. For any target webpage, a target webpage category and a target similarity of the target webpage may be determined according to a URL characteristic of the target webpage, but because the foregoing perpendicular domain name rule is a strong rule, and the URL characteristic is a weak rule, that is, on the premise that the two methods are both feasible, the former has a higher accuracy, if the target domain name is a perpendicular domain name, the target webpage category and the target similarity of the target webpage are preferentially determined according to the target domain name, and only if the target domain name is not a perpendicular domain name (the target domain name does not conform to the perpendicular domain name rule, and the target webpage category or the target similarity cannot be determined according to the target domain name), the target webpage category and the target similarity of the target webpage are determined according to the URL characteristic of the target webpage.

It can be known from the foregoing technical solution that, in this embodiment of this application, whether an involved domain name is a perpendicular domain name is analyzed in advance according to the scoring model file, and therefore when header data of the target webpage is lacking (including lack of a title, lack of a keyword or the like), the target webpage category and the target similarity of the target webpage are determined according to the target domain name or the URL of the target webpage, so as to ensure that classification is successful and classification is accurate, where if the target domain name is a perpendicular domain name, the target webpage category and the target similarity are determined preferentially according to the target domain name, and if the target domain name is not a perpendicular domain name, the target webpage category and the target similarity are determined according to the URL characteristic of the target webpage. It can be seen that, the supplementary steps based on a domain name and a URL and provided in this embodiment of this application may avoid a problem that target webpage classification precision is insufficient or even classification fails and that is caused due to lacking of a header, and are simple and easily implemented, so as not to affect webpage classification efficiency.

Figure 3:
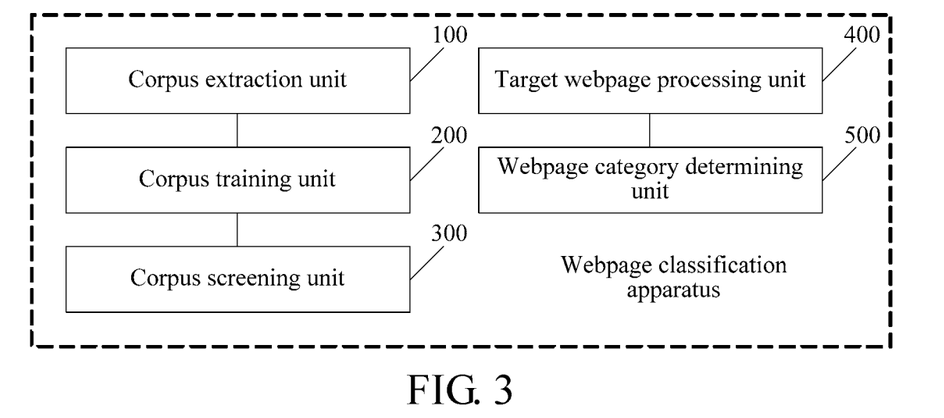
FIG. 3 is a functional block diagram of a webpage classification apparatus according to an exemplary embodiment.

FIG. 3 is a functional block diagram of a webpage classification apparatus according to an exemplary embodiment. Function modules of the webpage classification apparatus may be implemented by hardware, software or a combination of hardware and software that implements the principle of the present disclosure. Persons skilled in the art may understand that, the function modules described FIG. 3 may be combined or divided into sub-modules, thereby implementing the foregoing principle of the present disclosure. Therefore, description of this text may support any possible combination, or division, or further limitation for the function modules described in this text.

Referring to FIG. 3, the apparatus includes: a corpus extraction unit 100, a corpus training unit 200, a corpus screening unit 300, a target webpage processing unit 400 and a webpage category determining unit 500.

The corpus extraction unit 100 is configured to obtain a title and a keyword in a header of each webpage, and record the obtained title and keyword as corpus words in a corpus. As described above, in another optional embodiment of this application, webpage classification processing may be performed by using a conventional corpus, and therefore the corpus extraction unit 100 is omitted.

The corpus training unit 200 is configured to train the corpus by using a word-to-vector tool word2vec, obtain a vector corresponding to each corpus word in the corpus, and record each corpus word and the corresponding vector in a classification model file.

The corpus screening unit 300 is configured to determine a vector corresponding to each preset classification seed word corresponding to each webpage category according to the classification model file, and calculate a vector sum of all classification seed words corresponding to a same webpage category; and search the classification model file for corpus words corresponding to vectors, which are within a preset similarity range with the vector sum, and record the found corpus word, the corresponding similarity, and a webpage category corresponding to the vector sum in a scoring model file.

The target webpage processing unit 400 is configured to obtain a target title and a target keyword in a header of a target webpage, search the scoring model file for target corpus words corresponding to the target title and the target keyword, and determine a target similarity and a target webpage category corresponding to each target corpus word according to the scoring model file.

The webpage category determining unit 500 is configured to calculate a sum of target similarities corresponding to a same target webpage category, and select at least one target webpage category corresponding to a maximum sum of target similarities as a classification result of the target webpage. As described above, persons skilled in the art may further configure the webpage category determining unit to select at least one target webpage category as a classification result of the target webpage according to the determined target similarity. For example, the webpage category determining unit is configured to only select a webpage category corresponding to a target corpus word having a maximum target similarity as the classification result of the target webpage; sort target corpus words in a descending order of target similarities, and select webpage categories corresponding to first N target corpus words as the classification result of the target webpage; or select webpage categories corresponding to all target corpus words whose target similarities are greater than the preset threshold as the classification result of the target webpage.

It can be known from the foregoing technical solution that, in the embodiments of this application, each corpus word in a corpus is converted into a vector, and therefore a processing process such as comparison between corpus words or similarity analysis is converted into vector calculation, so as to more conveniently implement computer automation, thereby improving webpage classification efficiency. Moreover, in the embodiments of this application, corpus words are correspondingly screened according to multiple preset classification seed words, and a corpus word unrelated to a webpage type may be removed, thereby improving webpage classification accuracy.

In a feasible embodiment of this application, to determine a target similarity corresponding to each target corpus word, the foregoing target webpage processing unit 400 may include: a weight coefficient setting unit and a target similarity calculation unit.

The weight coefficient setting unit is configured to separately set weight coefficients corresponding to the target title and the target keyword.

The target similarity calculation unit is configured to: for a first target corpus word corresponding to the target title, calculate a product of a reference similarity corresponding to the first target corpus word in the scoring model file and a first weight coefficient corresponding to the target title, and obtain a target similarity corresponding to the first target corpus word; and for a second target corpus word corresponding to the target keyword, calculate a product of a reference similarity corresponding to the second target corpus word in the scoring model file and a second weight coefficient corresponding to the target keyword, and obtain a target similarity corresponding to the second target corpus word.

Figure 4:
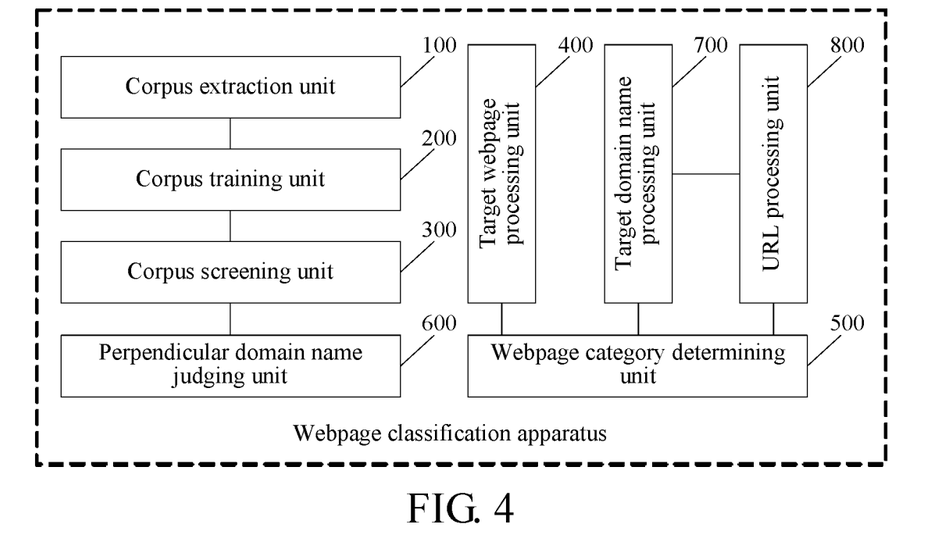
FIG. 4 is a functional block diagram of another webpage classification apparatus according to an exemplary embodiment.

Referring to FIG. 4, a webpage classification apparatus provided in another feasible embodiment of this application may further include a perpendicular domain name judging unit 600.

The perpendicular domain name judging unit 600 is configured to separately use each webpage under a same domain name as the target webpage, and determine a classification result of each webpage; and judge whether the classification result of each webpage under the same domain name and a similarity corresponding to the classification result satisfy a preset threshold condition, and if the preset threshold condition is satisfied, record the corresponding domain name as a perpendicular domain name in a perpendicular domain name list.

Additionally, based on the perpendicular domain name judging unit 600, the webpage classification apparatus provided in this embodiment may further include a target domain name processing unit 700.

The target domain name processing unit 700 is configured to: if the target title or the target keyword is unsuccessfully obtained, judge whether a target domain name corresponding to the target webpage exists in the domain name perpendicular list; and if the target domain name exists in the domain name perpendicular list, determine a target webpage category and a target similarity corresponding to the target webpage according to the target domain name.

Further, the webpage classification apparatus provided in this embodiment may further include a URL processing unit 800. The URL processing unit 800 is configured to: when the target domain name processing unit 700 judges that the target domain name does not exist in the domain name perpendicular list, determine a target webpage category and a target similarity corresponding to the target webpage according to a uniform resource locator URL corresponding to the target webpage.

Specific methods used by various modules of the device in the above embodiment to perform operations have been described in detail in the related method embodiments, and will not be elaborated here.

Additionally, an embodiment of this application further provides a non-transitory computer storage medium, which may be, for example, a ROM, a random access memory (RAM), a CD-ROM, a magnetic tape, a floppy disk and an optical data storage device. The computer storage medium stores a program, and when the program in the storage medium is executed by a processor of a related device, the device is enabled to execute some or all steps of the webpage classification method recorded in the foregoing method embodiment.

Moreover, an embodiment of this application further provides a computing device, and the computing device includes a memory and a processor. The memory stores webpage related information, and the processor reads the webpage related information from the memory, and executes some or all steps of the webpage classification method recorded in the foregoing method embodiment. The computing device may be, for example, a personal computer, a server, a mobile terminal such as a mobile phone, or a network device.

The foregoing technical idea of the present disclosure may be further implemented as a computing device, where the computing device includes a processor and a non-transitory machine readable storage medium. The non-transitory machine readable storage medium stores executable code. When the executable code is executed by the processor, the processor is enabled to execute some or all steps of the webpage classification method recorded in the foregoing method embodiment.

Other embodiments of the present disclosure will be apparent to those skilled in the art from consideration of the specification and practice of the present disclosure disclosed here. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the present disclosure only be limited by the appended claims.

What is claimed is:

1. A webpage classification method, comprising:
   extracting titles and keywords from respective headers of webpages;
   recording the extracted titles and the extracted keywords as corpus words in a corpus;
   training the corpus by:
      using a word-to-vector tool, obtaining respective vectors of the corpus words in the corpus, and recording the corpus words and the respective vectors in a classification model file;
      determining a vector corresponding to each classification seed word corresponding to each of webpage categories according to the classification model file;
      removing, from the corpus, a corpus word not corresponding to any of the webpage categories;
      calculating a vector sum of all classification seed words corresponding to a same webpage category;
      searching the classification model file for corpus words corresponding to vectors, which are within a similarity range with the vector sum, and recording the found corpus words, the corresponding similarities, and a webpage category corresponding to the vector sum in a scoring model file;
      searching the scoring model file for target corpus words corresponding to a target title and a target keyword in a header of a target webpage;
      determining, for each of the target corpus words, according to the scoring model file, a target webpage category having a highest target similarity and a target similarity corresponding to the target webpage category;
      calculating, for each target webpage category determined to have a highest target similarity to at least one of the target corpus words, a sum of one or more determined target similarities corresponding to the target webpage category and the at least one of the target corpus words; and
      selecting, from the each determined target webpage category, a target webpage category having a highest sum as a classification result of the target webpage.

2. The webpage classification method according to claim 1, wherein the determining a target similarity corresponding to the target webpage category comprises:
   separately setting weight coefficients corresponding to the target title and the target keyword;
   for a first target corpus word corresponding to the target title, calculating a product of a reference similarity corresponding to the first target corpus word in the scoring model file and a first weight coefficient corresponding to the target title, and obtaining a target similarity corresponding to the first target corpus word; and
   for a second target corpus word corresponding to the target keyword, calculating a product of a reference similarity corresponding to the second target corpus word in the scoring model file and a second weight coefficient corresponding to the target keyword, and obtaining a target similarity corresponding to the second target corpus word.

3. The webpage classification method according to claim 1, further comprising:
   separately using each webpage under a same domain name as the target webpage, and determining a classification result of each webpage; and
   in response to judging that the classification result of each webpage under the same domain name and a similarity corresponding to the classification result satisfy a threshold condition, recording the corresponding domain name as a perpendicular domain name in a perpendicular domain name list.

4. The webpage classification method according to claim 3, further comprising:
   if the target title or the target keyword cannot be obtained, judging whether a target domain name corresponding to the target webpage exists in the domain name perpendicular list; and
   in response to judging that the target domain name exists in the domain name perpendicular list, determining a target webpage category and a target similarity corresponding to the target webpage according to the target domain name.

5. The webpage classification method according to claim 4, further comprising:
   in response to judging that the target domain name does not exist in the domain name perpendicular list, determining a target webpage category and a target similarity corresponding to the target webpage according to a uniform resource locator URL corresponding to the target webpage.

6. A non-transitory machine readable storage medium, storing executable code, wherein when the executable code is executed by a processor, the processor executes the webpage classification method according to claim 1.

7. The method of claim 1, further comprising: determining a difference between words in the corpus by determining a cosine value of an angle between vectors corresponding to the words in the corpus.

8. The method of claim 2, wherein the first weight coefficient corresponding to the target title is greater than the second weight coefficient corresponding to the target keyword.

9. The method of claim 1, wherein each classification seed word comprises a word or phrase not mentioning the corresponding webpage category.

10. The method of claim 1, further comprising:
    determining whether the corpus is a title or a keyword;
    in response to the corpus being a title, performing segmentation on the title; and
    in response to the corpus being a keyword, not performing segmentation on the title.

11. The method of claim 1, further comprising screening out corpus words describing a webpage type during the determining of the corresponding similarities on the vectors.

12. The method of claim 1, further comprising sorting target corpus words in a descending order of target similarities.

13. The method of claim 1, further comprising:
    determining whether a domain name of the target webpage is of a same type compared to other prestored webpages having a same domain name, based on:

a ratio of the highest sum to a total sum of similarities of all the corpus words corresponding to all target webpage categories; and a number of the other prestored webpages in the selected webpage category;

in response to determining that the domain name of the target webpage is of the same type compared to the other prestored webpages having the same domain name, storing and associating the domain name of the target webpage with the other prestored webpages as part of a domain name list; and if a title or a keyword is missing from another to-be-categorized webpage, categorizing the another to-be-categorized webpage based on the domain name list.

14. A webpage classification apparatus, comprising:

a corpus extraction unit configured to:
  extract titles and keywords from respective headers of webpages; and
  record the extracted titles and the extracted keywords as corpus words in a corpus;

a corpus training unit configured to train the corpus by:
  using a word-to-vector tool, obtaining respective vectors of the corpus words in the corpus, and recording the corpus words and the respective vectors in a classification model file;

a corpus screening unit configured to:
  determine a vector corresponding to each classification seed word corresponding to each webpage category according to the classification model file;
  calculate a vector sum of all classification seed words corresponding to a same webpage category;
  remove, from the corpus, a corpus word not corresponding to any of the webpage categories; and
  search the classification model file for corpus words corresponding to vectors,
which are within a similarity range with the vector sum, and record the found corpus words, the corresponding similarities, and a webpage category corresponding to the vector sum in a scoring model file;

a target webpage processing unit configured to:
  search the scoring model file for target corpus words corresponding to a target title and a target keyword in a header of a target webpage; and
  determine, for each of the target corpus words, according to the scoring model file, a target webpage category having a highest target similarity and a target similarity corresponding to the target webpage category; and
  calculate, for each target webpage category determined to have a highest target similarity to at least one of the target corpus words, a sum of one or more determined target similarities corresponding to the target webpage category and the at least one of the target corpus words; and a webpage category determining unit configured to select, from the each determined target webpage category, a target webpage category having a highest sum as a classification result of the target webpage.

15. The webpage classification apparatus according to claim 14, wherein the target webpage processing unit comprises:
  a weight coefficient setting unit configured to separately set weight coefficients corresponding to the target title and the target keyword; and
  a target similarity calculation unit configured to:
    for a first target corpus word corresponding to the target title, calculate a product of a reference similarity corresponding to the first target corpus word in the scoring model file and a first weight coefficient corresponding to the target title;
    obtain a target similarity corresponding to the first target corpus word;
    for a second target corpus word corresponding to the target keyword, calculate a product of a reference similarity corresponding to the second target corpus word in the scoring model file and a second weight coefficient corresponding to the target keyword; and
    obtain a target similarity corresponding to the second target corpus word.

16. The webpage classification apparatus according to claim 14, further comprising:
  a perpendicular domain name judging unit configured to:
    separately use each webpage under a same domain name as the target webpage determine a classification result of each webpage; and
    in response to judging that the classification result of each webpage under the same domain name and a similarity corresponding to the classification result satisfy a threshold condition, record the corresponding domain name as a perpendicular domain name in a perpendicular domain name list.

17. The webpage classification apparatus according to claim 16, further comprising:
  a target domain name processing unit, configured to:
    if the target title or the target keyword cannot be obtained, judge whether a target domain name corresponding to the target webpage exists in the domain name perpendicular list; and in response to judging that the target domain name exists in the domain name perpendicular list, determine a target webpage category and a target similarity corresponding to the target webpage according to the target domain name.

18. The webpage classification apparatus according to claim 17, further comprising:
  a URL processing unit configured to:
    in response to judging that the target domain name does not exist in the domain name perpendicular list, determine a target webpage category and a target similarity corresponding to the target webpage according to a uniform resource locator (URL) corresponding to the target webpage.

19. A computing device, comprising:
  a memory, wherein the memory stores webpage related information; and
  a processor, wherein the processor reads the webpage related information from the memory, and executes the following operations:
    extracting titles and keywords from respective headers of webpages;
    recording the extracted titles and the extracted keywords as corpus words in a corpus;
    training the corpus by:
      using a word-to-vector tool, obtaining respective vectors of the corpus words in the corpus, and recording the corpus words and the respective vectors in a classification model file;
    determining a vector corresponding to each classification seed word corresponding to each webpage category according to the classification model file;
    calculating a vector sum of all classification seed words corresponding to a same webpage category; and
    removing, from the corpus, a corpus word not corresponding to any of the webpage categories;

searching the classification model file for corpus words corresponding to vectors, which are within a similarity range with the vector sum, and recording the found corpus words, the corresponding similarities, and a webpage category corresponding to the vector sum in a scoring model file;

searching the scoring model file for target corpus words corresponding to a target title and a target keyword in a header of a target webpage;

determining, for each of the target corpus words, according to the scoring model file, a target webpage category having a highest target similarity and a target similarity corresponding to the target webpage category;

calculating, for each target webpage category determined to have a highest target similarity to at least one of the target corpus words, a sum of one or more determined target similarities corresponding to the target webpage category and the at least one of the target corpus words; and selecting, from the each determined target webpage category, a target webpage category having a highest sum as a classification result of the target webpage.

* * * * *